United States Patent
Imamura et al.

(10) Patent No.: US 8,379,662 B2
(45) Date of Patent: Feb. 19, 2013

(54) RADIO TRANSMITTING APPARATUS AND RADIO TRANSMITTING METHOD

(75) Inventors: Daichi Imamura, Kanagawa (JP); Sadaki Futagi, Ishikawa (JP); Atsushi Matsumoto, Ishikawa (JP); Takashi Iwai, Ishikawa (JP); Yoshihiko Ogawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 396 days.

(21) Appl. No.: 12/377,576

(22) PCT Filed: Aug. 16, 2007

(86) PCT No.: PCT/JP2007/065948
§ 371 (c)(1),
(2), (4) Date: Feb. 13, 2009

(87) PCT Pub. No.: WO2008/020609
PCT Pub. Date: Feb. 21, 2008

(65) Prior Publication Data
US 2010/0232284 A1  Sep. 16, 2010

(30) Foreign Application Priority Data

Aug. 17, 2006 (JP) .................. 2006-222198

(51) Int. Cl.
 *H04L 12/413* (2006.01)
(52) U.S. Cl. .................. 370/445; 370/437; 370/458
(58) Field of Classification Search .................. 370/437, 370/445, 458
See application file for complete search history.

(56) References Cited

U.S. PATENT DOCUMENTS

| 5,761,190 | A | 6/1998 | Yamauchi |
| 6,259,724 | B1* | 7/2001 | Esmailzadeh .................. 375/143 |
| 6,708,037 | B1 | 3/2004 | Moulsley |
| 7,643,454 | B2* | 1/2010 | Guethaus et al. ............. 370/335 |
| 2001/0036113 | A1 | 11/2001 | Jurgensen |
| 2004/0008658 | A1* | 1/2004 | Dahlman et al. .............. 370/342 |
| 2004/0100939 | A1 | 5/2004 | Kriedte |
| 2005/0254476 | A1* | 11/2005 | Sudo ............................ 370/342 |

(Continued)

FOREIGN PATENT DOCUMENTS

| JP | 8-228188 | 9/1996 |
| JP | 2001-352573 | 12/2001 |

(Continued)

OTHER PUBLICATIONS

International Search Report dated Sep. 11, 2007.

(Continued)

*Primary Examiner* — Jason Mattis
(74) *Attorney, Agent, or Firm* — Dickinson Wright PLLC

(57) ABSTRACT

A radio transmitting apparatus and a radio transmitting method wherein the throughput is improved and a fast initial access processing including an RA burst is accomplished. According to these apparatus and method, a signature table storing part (101) has a plurality of signature groups generated from a plurality of different Zadoff-Chu sequences with a set of signatures generated from one Zadoff-Chu sequence being one signature group. A signature sequence assignment control part (102) switches signature groups to be assigned to a UE for each of paging transmissions, thereby assigning a signature sequence, which is to be used for an initial RA, from the same signature group. A paging information generating part (104) causes the ID of the assigned signature sequence to be included into paging information, which is then transmitted to the UE.

18 Claims, 9 Drawing Sheets

U.S. PATENT DOCUMENTS

| | | | |
|---|---|---|---|
| 2006/0140255 A1 | 6/2006 | Jonsson | |
| 2007/0230600 A1* | 10/2007 | Bertrand et al. | 375/260 |
| 2007/0258540 A1* | 11/2007 | Ratasuk et al. | 375/267 |

FOREIGN PATENT DOCUMENTS

| | | |
|---|---|---|
| JP | 2003-506965 | 2/2003 |
| JP | 2004-180313 | 6/2004 |
| JP | 2006-500804 | 1/2006 |
| WO | 2004/028019 | 4/2004 |
| WO | 2006/015108 | 2/2006 |
| WO | 2006/020483 | 2/2006 |

OTHER PUBLICATIONS

3GPP TSG-RAN WG1 LTE Ad hoc meeting R1-061765, Panasonic, "Random access procedure for E-UTRA," Jun. 30, 2006, Fig.1(d), <URL:http://www.3gpp.org/ftp/tsg_ran/WG1_RL1/TSGR1_AH/LTE AH June-06/Docs/R1-061765.zip>, pp. 1-4.

TSG-RAN Working Group 2 #49, R2-052769, Seoul, Korea, Nov. 7-11, 2005, Agenda Item: 17.3.3, Source: LG Electronics, Title: "Initial access for LTE," Document for: Discussion and Decision, pp. 1-2.

3GPP TS 25.214 V6.7.1 (Dec. 2005), Technical Specification, 3rd Generation Partnership Project; Technical Specification Group Radio Access Network; Physical layer procedures (FDD), (Release 6), pp. 1-60.

Extended European Search Report dated Oct. 17, 2011.

Japanese Notice of Reasons for Rejection dated Oct. 18, 2011.

3GPP TSG RAN WG1 Ad Hoc on LTE, "On Allocation of Uplink Pilot Sub-Channels in EUTRA SC-FDMA," Texas Instruments, R1-050822, XP002448008, Aug. 29-Sep. 2, 2005, pp. 1-7.

B. Popović, et al., "Random Access Preambles for Evolved UTRA Cellular System," IEEE Ninth Internationl Symposium on Spread Spectrum Techniques and Applications, XP031047607, Aug. 1, 2006, pp. 488-492.

* cited by examiner

| SIGNATURE ID | SEQUENCE NUMBER (k) | NUMBER OF SHIFTS |
|---|---|---|
| 1 | 1 | 0 |
| 2 | 1 | 1 |
| 3 | 1 | 2 |
| 4 | 1 | 3 |
| 5 | 2 | 0 |
| 6 | 2 | 1 |
| 7 | 2 | 2 |
| 8 | 2 | 3 |
| 9 | 3 | 0 |
| 10 | 3 | 1 |
| 11 | 3 | 2 |
| 12 | 3 | 3 |

Signatures 1–4: SIGNATURE GROUP #1
Signatures 5–8: SIGNATURE GROUP #2
Signatures 9–12: SIGNATURE GROUP #3

FIG.2

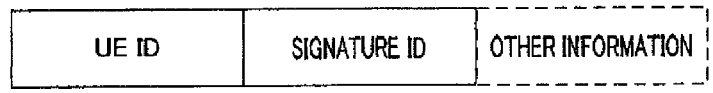
FIG.7A
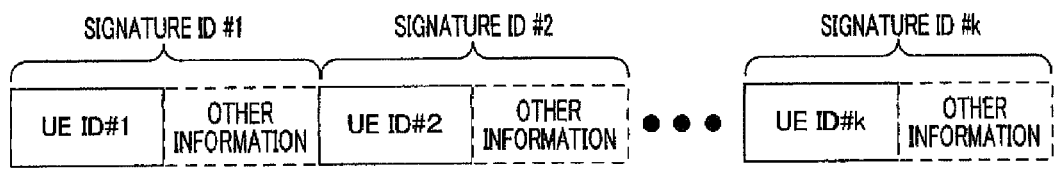
FIG.7B
| EXAMPLE OF N=25x4x4=400 | | | | |
|---|---|---|---|---|
| SIGNATURE ID | SEQUENCE NUMBER (k) | i OF b-TH TERM OF GCL | GREATEST COMMON DIVISOR BETWEEN \|k1-kx\| AND N | |
| 1 | 3 | 1 | ---- | SIGNATURE GROUP #1 |
| 2 | 3 | 2 | ---- | |
| 3 | 3 | 3 | ---- | |
| 4 | 3 | 4 | ---- | |
| 5 | 9 | 1 | 2 | SIGNATURE GROUP #2 |
| 6 | 9 | 2 | 2 | |
| 7 | 9 | 3 | 2 | |
| 8 | 9 | 4 | 2 | |
| 9 | 7 | 1 | 4 | SIGNATURE GROUP #3 |
| 10 | 7 | 2 | 4 | |
| 11 | 7 | 3 | 4 | |
| 12 | 7 | 4 | 4 | |
FIG.8

RADIO TRANSMITTING APPARATUS AND RADIO TRANSMITTING METHOD

TECHNICAL FIELD

The present invention relates to a radio transmitting apparatus and radio transmitting method.

BACKGROUND ART

In mobile communication systems represented by a cellular communication system or radio LAN (Local Area Network) system, random access areas are provided in the transmission domain. When a terminal station (hereinafter "UE") implements an association request to a base station (hereinafter "BS") at first, or when a UE implements a new band assignment request in a centralized control system where, for example, the BS assigns transmission time and transmission frequency band to the UE, random access areas are provided in the uplink. Here, a base station is also referred to as an "access point" or "Node B."

Further, in systems adopting TDMA (Time Division Multiple Access), which is currently standardized in 3GPP RAN LTE, when the initial association request is implemented (i.e., when the power supply of a UE is activated, and further when handover is performed, when communication is not performed for a predetermined period or when the transmission timing synchronization in the uplink is not established such a case where synchronization is lost due to the channel condition), a random access is utilized in the first process of acquiring uplink transmission timing synchronization, implementing an association request to the BS or implementing a band assignment request (i.e., resource request).

Unlike other channels to be scheduled, reception error and retransmission occur with respect to random access bursts (hereinafter "RA bursts") transmitted in a random access area (hereinafter "RA slot") due to signature sequence collision (i.e., transmitting the same signature sequence by a plurality of UEs using the same RA slot) or due to interference between signature sequences. When RA burst collision and reception error occur, the processing delay by acquiring uplink transmission timing synchronization including RA bursts and processing delay for association request processing to BS, increase. Therefore, a reduced collision rate of signature sequences and improved detection performance of signature sequences are required.

As a method of improving detection performance of signature sequences, studies are underway to generate signature sequences from a GCL (Generalized Chirp Like) sequence or Zadoff-Chu sequence of low autocorrelation characteristics and low cross-correlation characteristics between sequences.

In the WCDMA (Wideband-Code Division Multiple Access) system disclosed in Non-Patent Document 1, to prevent collision of preambles and identify transmitted preambles, a reduced collision rate of signatures is realized by providing a plurality (sixteen kinds) of signature sequences that can be transmitted and providing fifteen RA slots that can be selected randomly in twenty milliseconds. Further, in BS, by using code sequences of good autocorrelation characteristics and good cross-correlation characteristics between signature sequences as described above, it is possible to separate and detect individual signature sequences.

Here, a preamble refers to a signal sequence which is known between the transmitting apparatus and the receiving apparatus and which forms the random access channel. Generally, a random access channel is comprised of signal sequences of good autocorrelation characteristics and cross-correlation characteristics. Further, a signature refers to individual components of a preamble pattern, and, here, assume that a signature sequence is equivalent to a preamble pattern.

Further, in the technique disclosed in Non-Patent Document 2, a reduced collision rate of signature sequences and improved detection performance are realized by classifying the initial cell access including RA burst transmission into the processing to start from the network side (i.e., BS side) and the processing to start from the UE side and reporting paging information including system information related to RA burst transmission by RA burst transmission from the network side to the UE.

To be more specific, Non-Patent Document 2 discloses including uplink ("UL") interference information and dynamic persistent level parameter showing the retransmission time interval or the like, in paging information reported in the downlink, and reporting the paging information to a plurality of UEs one by one or at a time using PCH's (paging channels).

The UE having received the paging information uses the UL interference information to set RA burst transmission power. Further, it is possible to control the error rate of RA burst transmissions and the time intervals of RA burst transmissions using the UL interference information and dynamic persistent level parameter, so that the UE can control the priority of RA burst transmissions and select a more effective signature sequence.

Non-Patent Document 1: 3GPP TS 25.214V6.7.1 (6.Random access procedure), December, 2005 TSG-RAN working Group 2 #49, Seoul, Korea, Nov. 7-11, 2005

Non-Patent Document 2: R2-052769, LG Electronics, "Initial access for LTE" 3GPP TSG RAN WG1/2 Joint Meeting, Athens, Greece, Mar. 27-31, 2006

DISCLOSURE OF INVENTION

Problem to be Solved by the Invention

However, with the technique disclosed in Non-Patent Document 1, in systems adopting TDMA or TDMA-FDMA, many selectable RA slots are provided, and, consequently, the domain assigned for user data transmission decreases and throughput of the overall system degrades significantly.

Further, with the technique disclosed in Non-Patent Document 2, although improved detection performance of RA burst transmission is expected in the access steps to start from the network side, retransmission time intervals are controlled to reduce the collision rate of RA burst transmissions, and, consequently, the processing delay to complete RA burst transmissions increases.

It is therefore an object of the present invention to provide a radio transmitting apparatus and radio transmitting method for improving throughput and enabling faster initial access processing including RA burst transmission.

Means for Solving the Problem

The radio transmitting apparatus of the present invention employs a configuration having: an assigning section that, when a group of signature sequences that are orthogonal to each other or have low cross correlations to each other is a signature group, assigns signature sequences for use in an initial random access transmission by a radio communication terminal apparatus, from a same signature group in one or more signature groups; a control channel generating section that generates a control channel including identification information of the assigned signature sequences; and a transmitting section that transmits the generated control channel to the radio communication terminal apparatus.

The radio transmitting method of the present invention includes: an assigning step of, when a group of signature sequences that are orthogonal to each other or have low correlations to each other is a signature group, assigning signature sequences for use in an initial random access transmission by a radio communication terminal apparatus, from a same signature group in one or more signature groups; a control channel generating step of generating a control channel including identification information of the assigned signature sequences; and a transmitting step of transmitting the generated control channel to the radio communication terminal apparatus.

Advantageous Effect of the Invention

According to the present invention, it is possible to improve throughput and enable faster initial access processing including RA burst transmission.

BRIEF DESCRIPTION OF DRAWINGS

FIG. 2 illustrates a signature table formed with Zadoff-Chu sequences in detail;

FIG. 7 illustrates a report method of signature IDs;

FIG. 8 illustrates a signature table according to Embodiment 2 of the present invention;

BEST MODE FOR CARRYING OUT THE INVENTION

Figure 1:
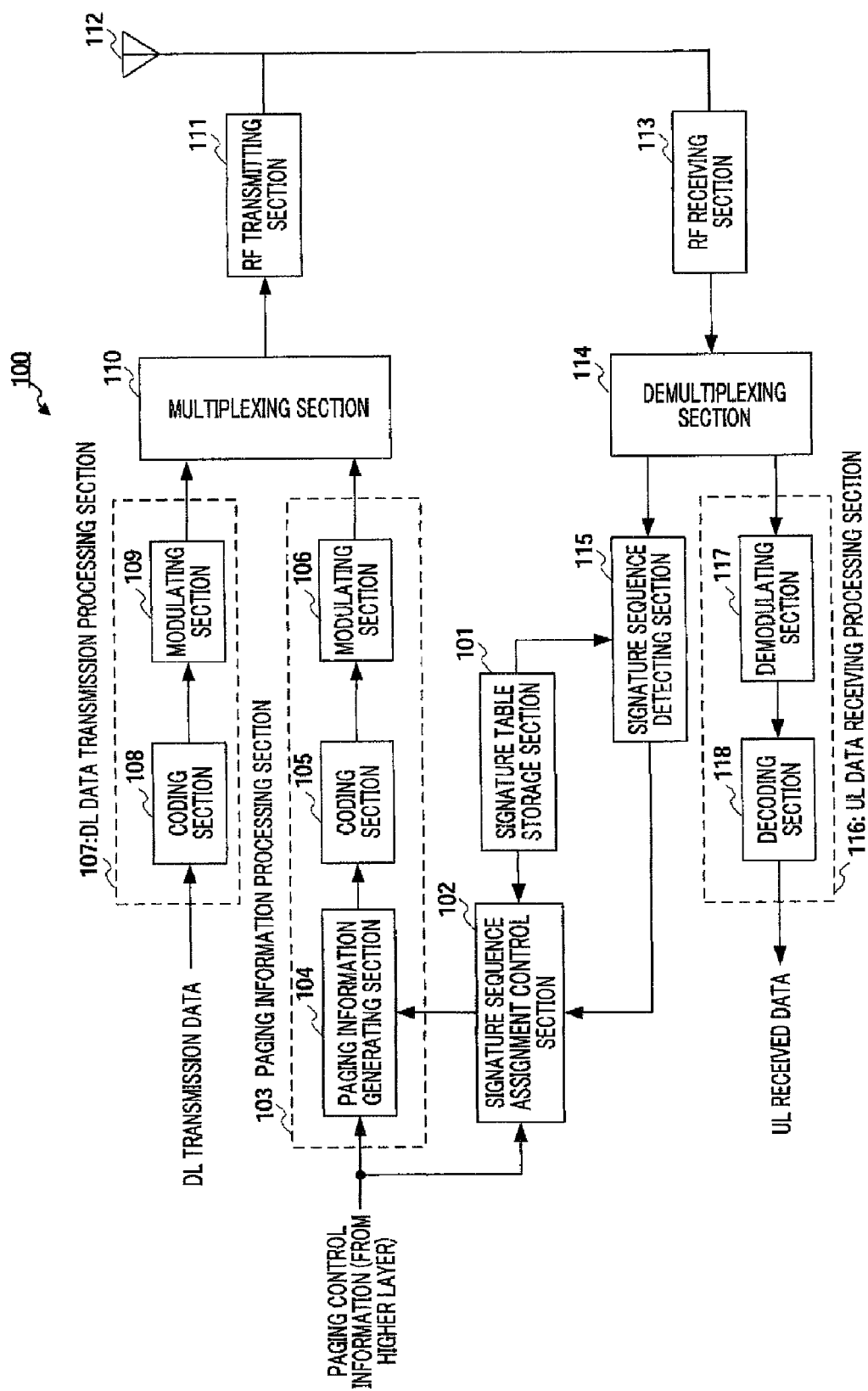
FIG. 1 is a block diagram showing the configuration of a base station apparatus according to Embodiments 1 and 2 of the present invention.

Embodiments of the present invention will be explained below in detail with reference to the accompanying drawings. However, in the embodiments, components having the same function will be assigned the same reference numerals and overlapping explanations will be omitted.

Embodiment 1

FIG. 1 is a block diagram showing the configuration of base station apparatus 100 according to Embodiment 1 of the present invention. In this figure, a plurality of signatures generated from a single Zadoff-Chu sequence form a single group (hereinafter "signature group"), and signature table storage section 101 stores a plurality of signature groups generated from a plurality of different Zadoff-Chu sequences. Further, the signature table will be described later in detail.

Signature sequence assignment control section 102 acquires the identity of the UE targeted for paging from the higher layer (not shown), while reading out a signature sequence from signature table storage section 101 and assigning the read signature sequence to the UE of the paging target. Further, according to a detection result outputted from signature sequence detecting section 115, which will be described later, signature sequence assignment control section 102 decides whether or not to retransmit RA bursts. Signature sequence assignment control section 102 will be described later in detail. Further, signature table storage section 101 and signature sequence assignment control section 102 function as an assigning means.

Paging information processing section 103 is provided with paging information generating section 104, coding section 105 and modulating section 106, and functions as a control channel generating means. Paging information generating section 104 generates a paging channel (i.e., downlink control channel) including the signature ID (and RA slot information if necessary) outputted from signature sequence assignment control section 102 and paging control information (i.e., information such as the identity of the UE and others reported by paging) inputted from the higher layer (not shown). The generated paging channel is outputted to coding section 105.

Coding section 105 encodes the paging channel outputted from paging information generating section 104, and modulating section 106 modulates the encoded paging channel by a modulation scheme such as BPSK and QPSK. The modulated paging channel is outputted to multiplexing section 110.

DL data transmission processing section 107 is provided with coding section 108 and modulating section 109, and performs transmission processing of DL transmission data. Coding section 108 encodes the DL transmission data, and modulating section 109 modulates the encoded DL transmission data by a modulation scheme such as BPSK and QPSK, and outputs the modulated DL transmission data to multiplexing section 110.

Multiplexing section 110 time-multiplexes, frequency-multiplexes, spatial-multiplexes or code-multiplexes the paging channel outputted from modulating section 106 and the DL transmission data transmitted from modulating section 109, and outputs the multiplex signal to RF transmitting section 111.

RF transmitting section 111 performs predetermined transmission processing such as D/A conversion, filtering and up-conversion on the multiplex signal outputted from multiplexing section 110, and transmits the signal after radio transmission processing from antenna 112.

RF receiving section 113 performs predetermined receiving processing such as down-conversion and A/D conversion on the signal received via antenna 112, and outputs the signal after radio receiving processing to demultiplexing section 114.

Demultiplexing section 114 demultiplexer the signal outputted from RF receiving section 113 into RA slots and UL data slots, and outputs the demultiplexed RA slots to signature sequence detecting section 115 and the demultiplexed UL data slots to UL data receiving processing section 116 and demodulating section 117.

Signature sequence detecting section 115 performs preamble waveform detection processing such as correlation processing on the RA slots outputted from demultiplexing section 114 using the signatures stored in signature table storage section 101, and detects whether or not a signature sequence was transmitted. The detection result is outputted to signature sequence assignment control section 102.

UL data receiving processing section 116 is provided with demodulating section 117 and decoding section 118, and performs UL data receiving processing. Demodulating section 117 corrects the channel response distortion of the UL data outputted from demultiplexing section 114 and identifies the signal points by hard decisions or soft decisions depending on the modulation scheme. Decoding section 118 performs error correcting processing on a result of the signal point identification in demodulating section 117, and outputs UL received data.

Here, Zadoff-Chu sequences forming the signature table will be explained. First, a Zadoff-Chu sequence of the sequence length N is calculated by following equation 1 when N is an even number, and calculated by following equation 2 when N is an odd number.

(Equation 1)

$$c_k(n) = \exp\left\{-j\frac{2\pi k}{N}\left(\frac{n^2}{2} + qn\right)\right\} \quad [1]$$

(Equation 2)

$$c_k(n) = \exp\left\{-j\frac{2\pi k}{N}\left(\frac{n(n+1)}{2} + qn\right)\right\}, \quad [2]$$

where n is 0, 1, 2, ..., N−1, q is an arbitrary integer, and k is coprime to N and is a positive integer less than N.

Further, a cyclic-shifted Zadoff-Chu sequence generated by cyclically shifting the above-noted Zadoff-Chu sequence in units of shift amount Δ, that is, the sequence replacing n by (n+mΔ)mod N is shown in equation 3 when N is an even number, and is shown in equation 4 when N is an odd number.

(Equation 3)

$$c_{k,m}(n) = \exp\left\{-j\frac{2\pi k}{N}\left(\frac{((n+m\Delta)\bmod N)^2}{2} + q((n+m\Delta)\bmod N)\right)\right\} \quad [3]$$

(Equation 4)

$$c_{k,m}(n) = \exp\left\{-j\frac{2\pi k}{N}\left(\frac{((n+m\Delta)\bmod N)\cdot((n+m\Delta)\bmod N + 1)}{2} + q((n+m\Delta)\bmod N)\right)\right\}, \quad [4]$$

where n is 0, 1, 2, ..., N−1, q is an arbitrary integer, k is coprime to N and is a positive integer less than N, m is 0, 1, ..., M−1, and M is the biggest integer not exceeding N/Δ.

The cross-correlation is ideally zero in detection period τ that is in the range of 0≦τ<Δ, between sequences generated by cyclically shifting the same Zadoff-Chu sequence (i.e., sequences where k, N and q are the identical values and only m varies).

However, although mutual interference between sequences has a relatively low value because of the influence of frequency selective fading by multipath transmission upon performing broadband transmission, mutual interference does not have a zero value. Further, Zadoff-Chu sequences of different sequence numbers k are non-orthogonal, and mutual interference between the Zadoff-Chu sequences with different sequence numbers k is greater than mutual interference between cyclic-shifted sequences.

When a cyclic-shifted sequence is adopted as an RA burst signature sequence, Δ is set a larger value than the maximum RTD (Round Trip Delay) time estimated in each BS. That is, the RTD of the RA burst decreases when the cell radius is smaller, so that the value of Δ decreases, thereby generating more cyclic-shifted sequences.

By contrast, the RTD of the RA burst increases when the cell radius is larger, and the value of Δ increases. Consequently, the number of cyclic-shifted sequences that can be generated from the same Zadoff-Chu sequence decreases.

Therefore, cyclic-shifted sequences that can be generated from a single Zadoff-Chu sequence are limited by the cell radius, and, consequently, to form a group of signature sequences which normally a single BS requires, signature sequences are formed with a plurality of Zadoff-Chu sequences of different sequence numbers k and their respective cyclic-shifted sequences.

A signature table formed with such Zadoff-Chu sequences will be explained in detail using FIG. 2. FIG. 2 illustrates a signature table including three groups of signature groups #1 to #3.

Signature group #1 is associated with Zadoff-Chu sequence of sequence number k=1 and formed with four cyclic-shifted sequences of the numbers of shifts m=0-3. Further, signature group #2 is associated with the Zadoff-Chu sequence of sequence number k=2 and formed with four cyclic-shifted sequences of the numbers of shifts m=0-3. Further, signature group #3 is associated with the Zadoff-Chu sequence of sequence number k=3 and formed with four cyclic-shifted sequences of the numbers of shifts m=0-3. Thus, in each signature group, the sequence number k is the same in the group formed with different sequences of different numbers of shifts, m.

The signature groups shown in FIG. 2 show signature sequence groups that can be assigned at the same time.

Further, when the signature group configuration shown in FIG. 2 is adopted, the sequence length N is preferably equivalent to prime-number Zadoff-Chu sequences such that the cross-correlation characteristics are uniform between sequences of different sequence numbers k. Further, in an environment where many cyclic-shifted sequences can be generated, it is preferable to form a signature table where sequence number k is the same value between signature groups as much as possible.

Figure 3:
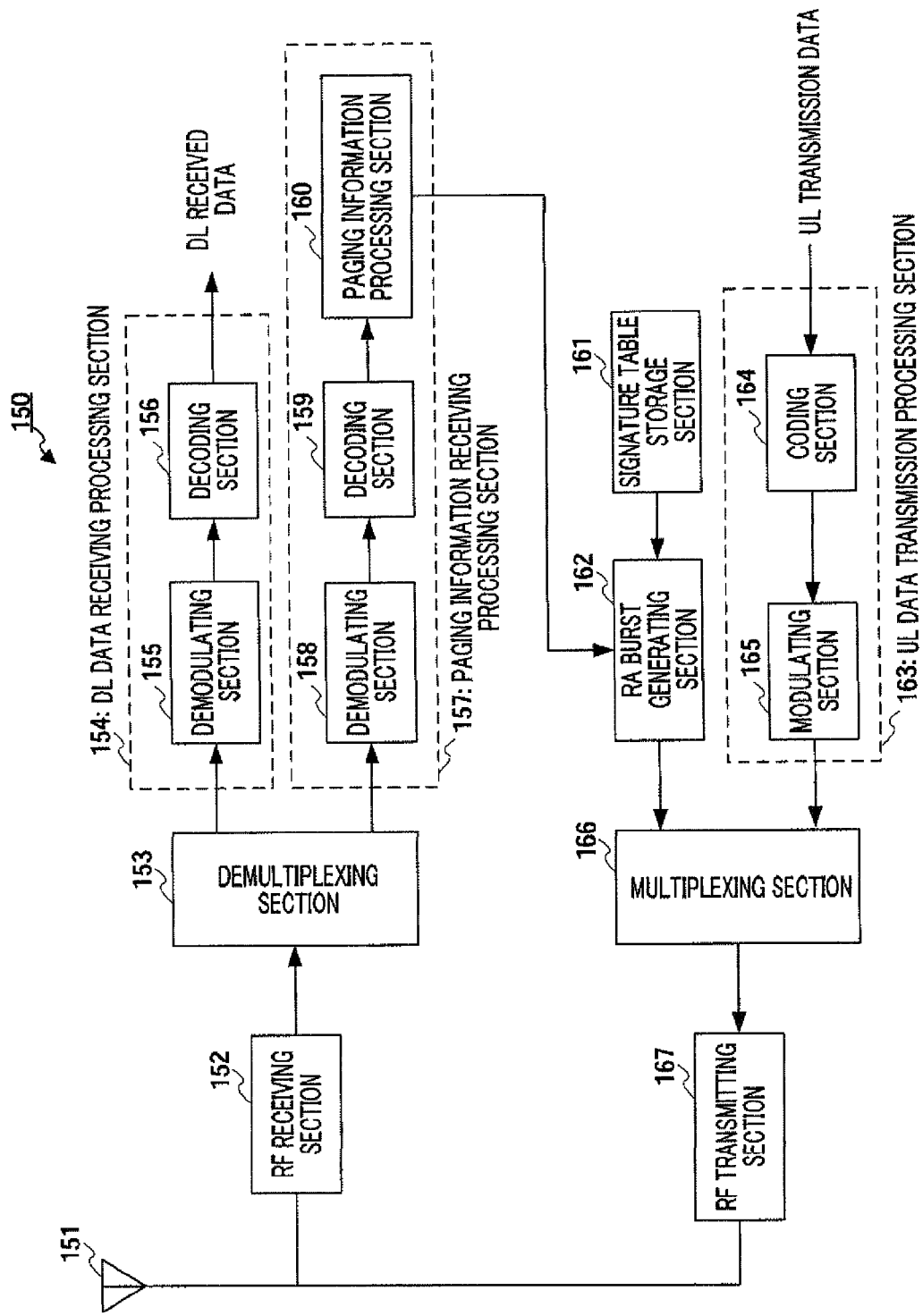
FIG. 3 is a block diagram showing the configuration of a terminal station apparatus according to Embodiments 1 and 2 of the present invention.

FIG. 3 is a block diagram showing the configuration of terminal station apparatus 150 according to Embodiment 1 of the present invention. In this figure, RF receiving section 152 receives a signal transmitted from the BS shown in FIG. 1 via antenna 151, performs predetermined radio receiving processing such as down-conversion and A/D conversion on the received signal and outputs the signal after radio receiving processing to demultiplexing section 153.

Demultiplexing section 153 demultiplexes the signal outputted from RF receiving section 152 into the paging information and DL data, and outputs the demultiplexed DL data to demodulating section 155 of DL data receiving processing section 154, and the paging information to demodulating section 158 of paging information receiving processing section 157.

DL data receiving processing section 154 is provided with demodulating section 155 and decoding section 156, and performs receiving processing on DL data. Demodulating section 155 performs channel response distortion compensation of the DL data outputted from demultiplexing section 153 and identifies the signal points by hard decisions or soft decisions depending on the modulation scheme, and decoding section 156 performs error correcting processing on the signal point identification result in demodulating section 155 and outputs the DL received data.

Paging information receiving processing section 157 is provided with demodulating section 158, decoding section 159 and paging information processing section 160, and performs receiving processing of paging information. Demodulating section 158 performs channel response distortion compensation of the paging information outputted from demultiplexing section 153, identifies the signal points by hard decisions or soft decisions depending on the modulation scheme, and decoding section 159 performs error correcting processing on the signal point identification result of the paging information in demodulating section 158 and outputs the paging information after error correcting processing, to paging information processing section 160.

Based on the identity of the UE included in the paging information outputted from decoding section 159, paging information processing section 160 decides whether the paging information is directed to the UE. When the paging information is directed to the UE, the signature ID and RA slot information included in the paging information are outputted to RA burst generating section 162. When the paging information is not directed to the UE, the paging information is discarded.

Signature table storage section 161 has the same signature table as in signature table storage section 101 of the BS shown in FIG. 1. That is, a plurality of signatures generated from a single Zadoff-Chu sequence form a single signature group, and signature table storage section 161 stores a plurality of signature groups generated from a plurality of different Zadoff-Chu sequences.

RA burst generating section 162 reads out a signature sequence associated with the signature ID outputted from paging information processing section 160, generates RA bursts including the read signature sequence and outputs the generated RA bursts to multiplexing section 166.

UL data transmission processing section 163 is provided with coding section 164 and modulating section 165, and performs transmission processing of UL transmission data. Coding section 164 encodes the UL transmission data, and modulating section 165 modulates the encoded UL transmission data by a modulation scheme such as BPSK and QPSK, and outputs the modulated UL transmission data to multiplexing section 166.

Multiplexing section 166 multiplexes the RA bursts outputted from RA burst generating section 162 and UL transmission data outputted from modulating section 165, and outputs the multiplex signal to RF transmitting section 167.

RF transmitting section 167 performs predetermined radio transmission processing such as D/A conversion, filtering and up-conversion on the multiplex signal outputted from multiplexing section 166 and transmits the signal after radio transmission processing from antenna 151.

Next, the random access procedure between BS 100 shown in FIG. 1 and UE 150 shown in FIG. 2 will be explained using FIG. 4. Here, first, assume that UE 150 does not transmit or receive data for a certain period and is in an idle state.

Figure 4:
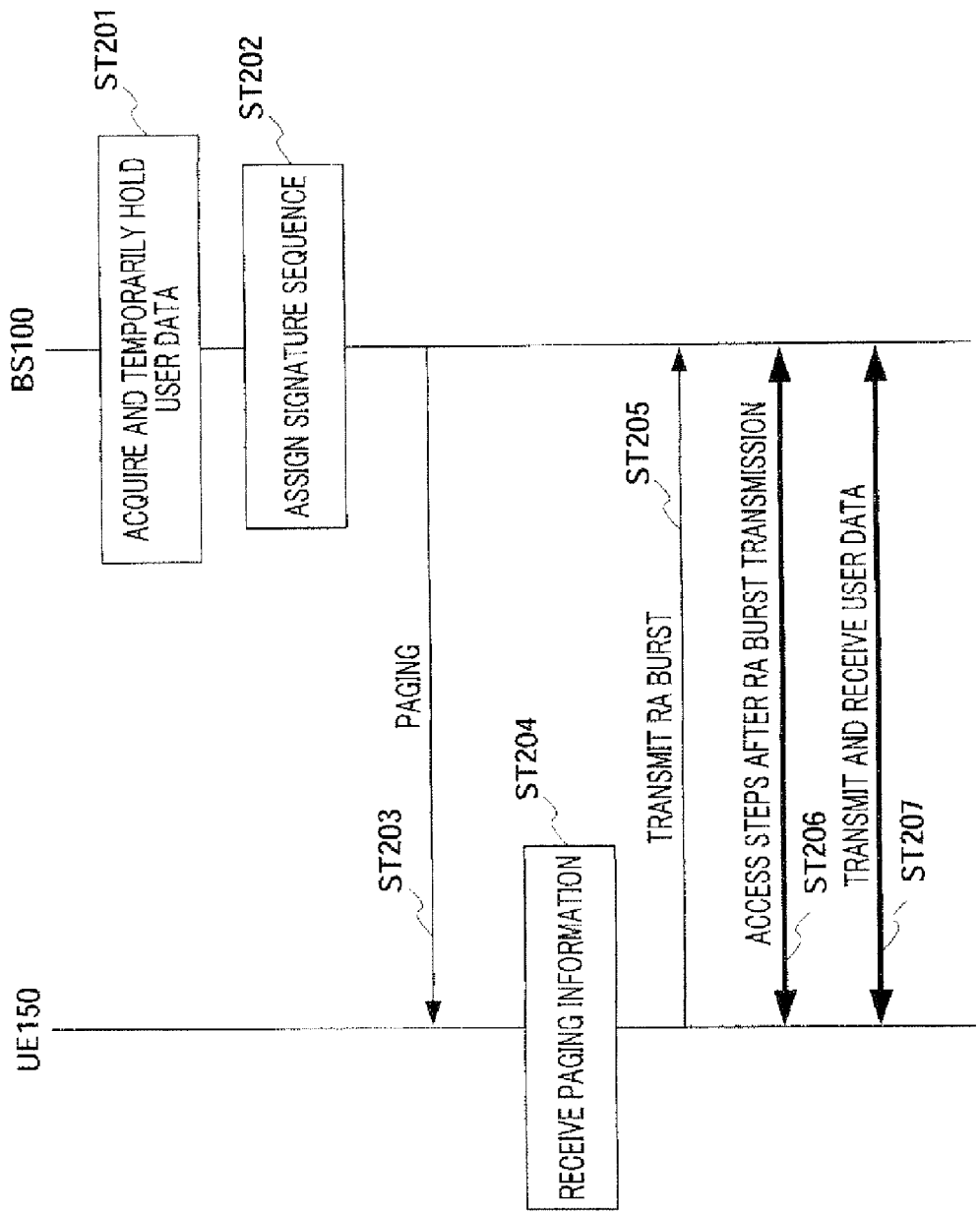
FIG. 4 is a sequence diagram showing the random access procedure between the BS shown in FIG. 1 and the UE shown in FIG. 2.

In ST201 in FIG. 4, BS 100 acquires user data directed to UE 150 from the higher layer. Here, BS 100 is in a state where the association between BS 100 and UE 150 is not established, and therefore BS 100 temporarily holds the acquired user data.

In ST202, from the signature table held in signature storage section 101 of BS 100, BS 100 selects one signature group and assigns a signature sequence from the selected signature group to UE 150.

In ST203, BS 100 signals to UE 150 paging information including the UE ID, the signature ID assigned to UE 150 and RA slot information, using a downlink control channel (e.g., paging channel).

In ST204, UE 150 having received the paging information acquires the UE ID, signature ID and RA slot information included in the paging information. When the UE ID indicates UE 150, UE 150 reads out the signature associated with the acquired signature ID from the same signature table as that of BS 100, and, in ST205, performs RA burst transmission using the acquired RA slot.

In ST206, when BS 100 having received the RA bursts detects a preamble associated with the signature ID included in the paging information in ST203 amongst the received RA bursts, BS 100 performs transmission and reception of information required to transmit user data by reporting ACK for RA bursts, uplink transmission start timing control information (i.e., time alignment information) and temporary UE ID (equivalent to C-RNTI in WCDMA) used for a band assignment report.

In ST207, band assignment of user data and transmission and reception of the user data are performed between BS 100 and UE 150.

Figure 5:
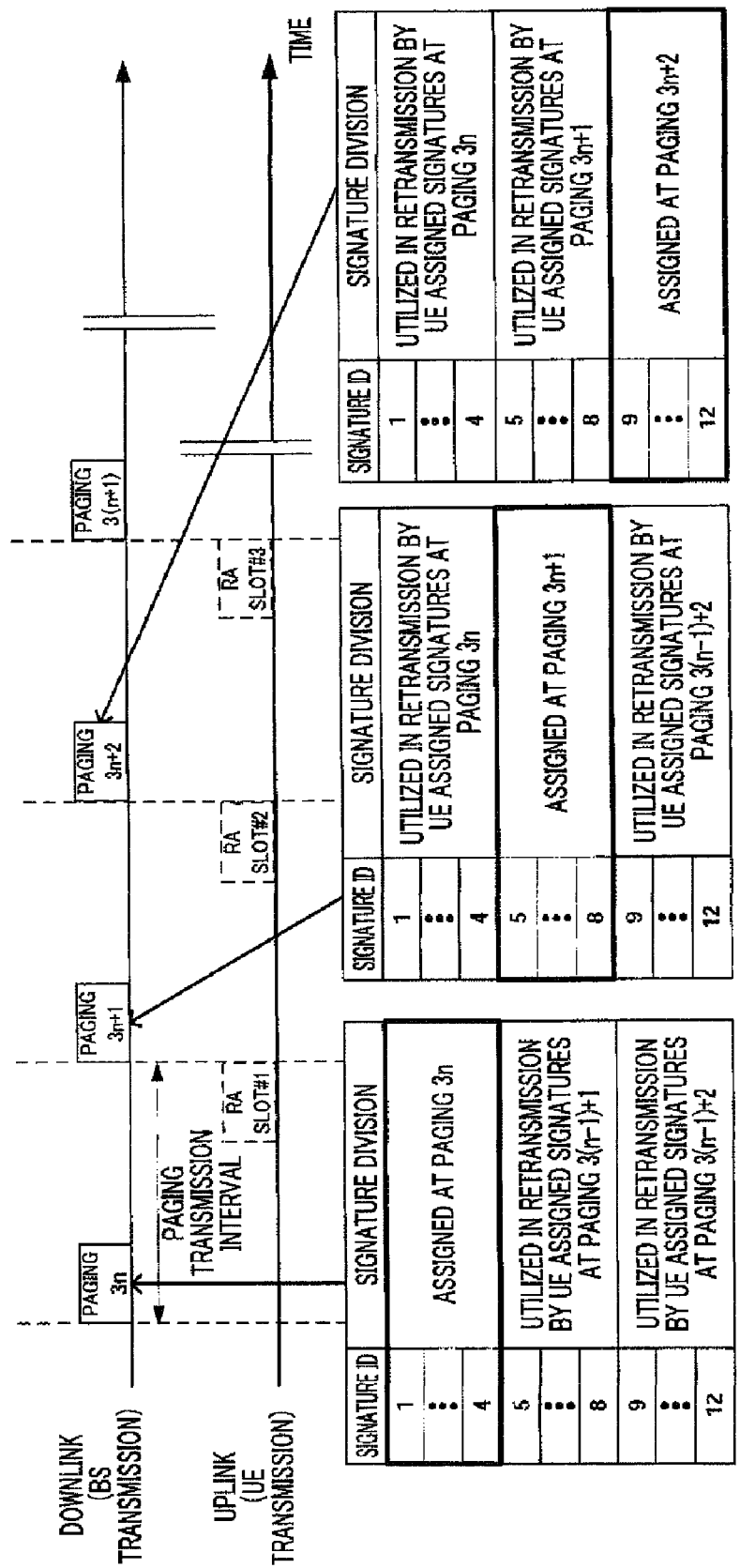
FIG. 5 illustrates the operations of the signature sequence assignment control section shown in FIG. 1.

Next, the operations of signature sequence assignment control section 102 of BS 100 shown in FIG. 1 will be explained using FIG. 5. Signature sequence assignment control section 102 switches the signature group to assign to the UE every transmission timing of paging information. In this figure, three signature groups shown in FIG. 2 are used as an example. Detailed explanations are as follows.

At paging transmission timing $3n$, the signature sequences of signature group #1 are assigned on a per UE basis, and the UEs assigned the signature sequences of signature group #1 perform RA burst transmissions in RA slot #1.

At paging transmission timing $3n+1$, the signature sequences of signature group #2 are assigned on a per UE basis, and the UEs assigned the signature sequences of signature group #2 perform RA burst transmissions in RA slot #2. Further, in RA slot #2, in the UEs assigned the signature sequences of signature group #1 at paging transmission timing $3n$, retransmissions are performed by the UEs having failed to perform RA burst transmissions in RA slot #1. In this case, the UEs perform retransmissions using the same signature sequences as the signature sequences assigned at paging transmission timing $3n$.

Similarly, at paging transmission timing $3n+2$, the signature sequences of signature group #3 are assigned on a per UE basis. In RA slot. #3, the UEs assigned the signature sequences of signature group #3 perform RA burst transmissions and the UEs assigned signature sequences at paging transmission timing $3n$ and $3n+1$ perform retransmissions.

At paging transmission timing $3(n+1)$, the signature sequences of signature group #1 are assigned on a per UE basis again, and the UEs assigned the signature sequences of signature group #1 perform RA burst transmissions in RA slot #1. In this case, although the signature sequences are assigned at paging transmission timing $3n$, even if the RA bursts from the UEs are not received correctly, the UEs do not perform RA burst retransmissions unless paging is performed again.

As described above, by changing the signature group to assign to the UEs every paging transmission, it is possible to prevent collision of signature sequences in RA bursts to be retransmitted.

Here, the reason for forming signature groups with signature sequences producing less mutual interference than between the signature groups, will be explained. Although all the UEs indicated by paging perform initial transmissions of RA bursts, almost all of the RA burst transmissions succeed, and the expected value of RA bursts to be retransmitted is relatively small compared to the number of initial RA burst transmissions. Thus, initial RA burst transmissions immediately after the paging signaling are predominant in RA burst transmissions sent in an RA slot at the same time, and, consequently, as shown in FIG. 6, by setting a signature table such that mutual interference power between the signature sequences of the initial RA bursts is low, it is possible to increase the number of RA bursts that can be transmitted per RA slot.

Figure 6A:
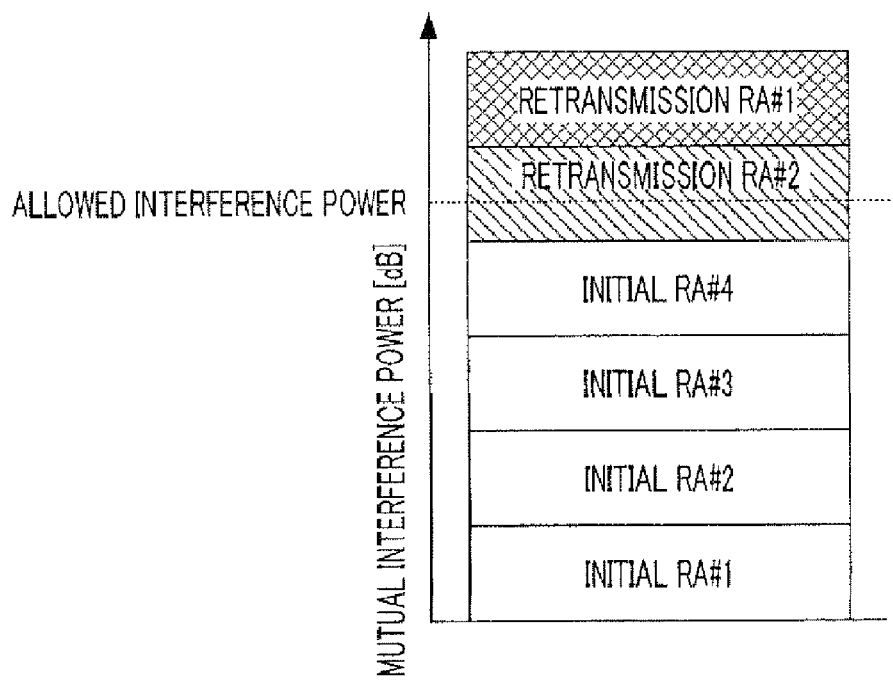
FIG. 6 illustrates the number of transmittable RAs per RA slot according to mutual interference power between signature sequences of the initial RA.
Figure 6B:
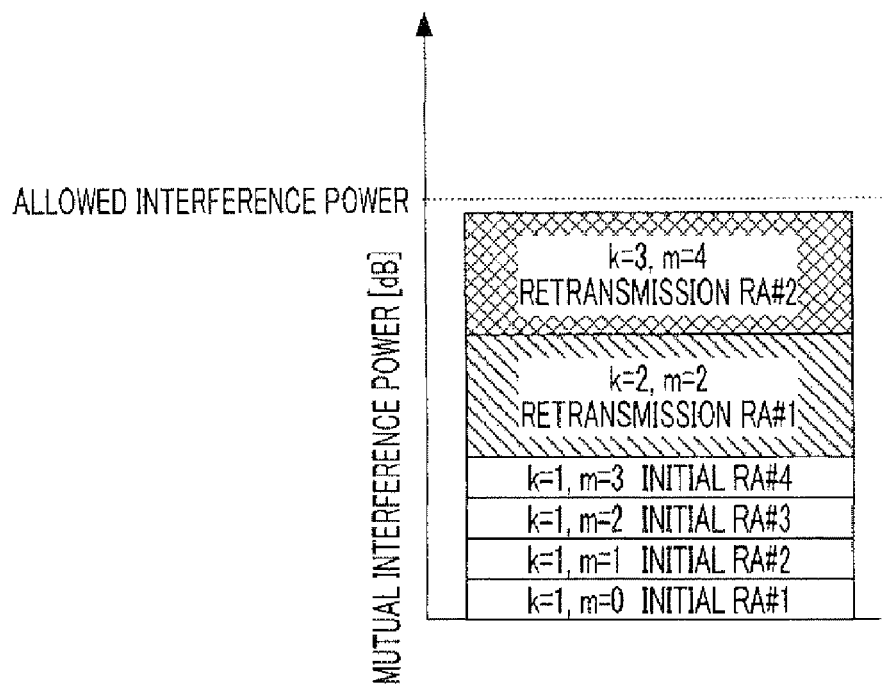

Further, FIG. 6A shows a case where mutual interference power between signature sequences upon initial RA burst transmission and signature sequences upon RA burst retransmission is identical in each slot. Further, FIG. 6B shows a case where mutual interference power between signature sequences upon initial RA burst transmission is made small. FIG. 6A shows that the number of RA bursts that can be transmitted per RA slot is four, and FIG. 6B shows that the number of RA bursts that can be transmitted per RA slot is six.

As described above, according to Embodiment 1, assume that a single group formed with a plurality of signatures generated from a single Zadoff-Chu sequence is a signature group, and, by providing a plurality of signature groups generated from a plurality of different Zadoff-Chu sequences and changing the signature group to assign to UEs every paging transmission, it is possible to prevent collision of initial RA burst transmissions and prevent collision of RA burst retransmissions. Further, mutual interference between signature sequences transmitted in the same RA slot can be reduced, so that it is possible to increase the number of signature sequences that can be assigned at the same time.

Further, with the present embodiment, as a method of reporting signature IDs, as shown in FIG. 7A, it is possible to adopt a method of expressly transmitting signature IDs as control information. Further, when a plurality of items of paging information that are generated at the same time are informed collectively, as shown in FIG. 7B, it is possible to prevent an increase of control information to report signature IDs by setting in advance the order of UE IDs and the order of signature IDs. Further, this is applied to a case where RA slots for paging are reported by paging information.

Further, although a case has been described with the present embodiment where the Zadoff-Chu sequence is used as an RA signature sequence, it is equally possible to use the GCL sequence. A case will be briefly described below where the GCL sequence is used. The GCL sequence of the sequence length N is calculated by equation 5 when N is an even number and calculated by equation 6 when N is an odd number.

(Equation 5)

$$c_{k,m}(n) = \exp\left\{-j\frac{2\pi k}{N}\left(\frac{n^2}{2} + qn\right)\right\} b_i(n \bmod m) \quad [5]$$

(Equation 6)

$$c_{k,m}(n) = \exp\left\{-j\frac{2\pi k}{N}\left(\frac{n(n+1)}{2} + qn\right)\right\} b_i(n \bmod m), \quad [6]$$

where n is 0, 1, 2, ..., N−1, q is an arbitrary integer, k is coprime to N and is a positive integer less than N, $b_i(n \bmod m)$ is an arbitrary complex number and i is 0, 1, ..., m−1. Further, to minimize the cross-correlation between GCL sequences, $b_i(n \bmod m)$ uses an arbitrary complex number of amplitude of 1. A signature group is a group formed with sequences where k, N and q are identical and only varies in the above-noted equations. Alternatively, a GCL sequence is generated by multiplying a Zadoff-Chu sequence by $b_i(n \bmod m)$, so that, similar to a Zadoff-Chu sequence, is possible to form a signature group by sequences where only the number of cyclic shifts, m, varies.

Further, with the present embodiment, when the number of UEs subject to paging is greater than the number of signature sequences of the signature group, signature sequences are assigned in order from the UE of the highest priority. As a UE of a higher priority, there are UEs that perform communication requiring short delay time (e.g., VoIP, video streaming, gaming, etc.) and UEs providing high QoS (Quality of Service) (users pay more money for services).

When there are no more signature sequences to assign, it is possible to delay the timing to assign signature groups and perform paging after available signature sequences are found. Alternatively, it is equally possible not to assign signature sequences to UEs and command the UEs to start RA burst transmissions. By this means, even when there are no more signature sequences to assign, if a UE receives services where allowed delay is large, it is possible to allow the processing delay of the initial access processing.

Embodiment 2

The configurations of the BS and UE according to Embodiment 2 of the present invention are the same as the configurations shown in FIG. 1 and FIG. 3 of Embodiment 1, and will be explained using FIG. 1 and FIG. 3.

First, in the Zadoff-Chu sequences shown in Embodiment 1, the cross-correlation characteristics between two different sequence numbers k=k1 and k=k2 will be explained. The cross-correlation characteristics have the following relationships. When the greatest common divisor between |k1−k2| and N is one, the peak value of cross-correlation is $\sqrt{N}$. Further, when the greatest common divisor between |k1−k2| and N is not one, the peak value of the cross-correlation is greater than $\sqrt{N}$. Further, the peak value of cross-correlation increases in proportion to the scale of the greatest common divisor.

Although the greatest common divisor between |k1−k2| and N is one with respect to all k's when the sequence length N is a prime number, the sequence length N needs to hold the relationship $N=sm^2$ or N=tm when a matched filter of a small amount of calculations (or small circuit scale) is adopted in the GCL sequence, N is not a prime number. Here, s, m and t are integer numbers equal to or greater than one.

Therefore, when the GCL sequence of the sequence length N that holds the relationship $N=sm^2$ or N=tm is used as a signature sequence, the greatest common divisor between |k1−k2| and N is not one, and a sequence where the peak value of cross-correlation is greater than $\sqrt{N}$ is utilized.

Further, FIG. 8 illustrates the configuration of a signature table of the BS to which N=400 (s=25, m=4, $N=sm^2=25\times 4\times 4=400$) and sequence number k=3, 7, 9 are applicable. The signature groups shown in FIG. 8 are formed with sequences where the sequence number k is the same in the signature group and i of the b-th term of the GCL varies in the group.

Further, as for the signatures to assign to signature groups #2 and #3, sequence numbers are assigned to signature groups

2 and #3 in order from sequence number k to minimize the greatest common devisor between the sequence length N and the absolute value of |k1−kx| which is the difference between the sequence number k1 used in signature group #1 and kx.

In the example shown in FIG. 8, sequence number k=3 is assigned to signature group #1, and the absolute value of the difference between k1=3 and k2=7 and the absolute value of the difference between k=3 and k3=9 are 4 and 6, respectively. The greatest common divisor between |k1−k2| and sequence length N is four in a case of k2=7, and the greatest common divisor between |k1−k3| and sequence length N is two in a case of k3=9. Consequently, k=9 is set for the sequence number of signature group #2 and k=7 is set for the sequence number of signature group #3.

Figure 9:
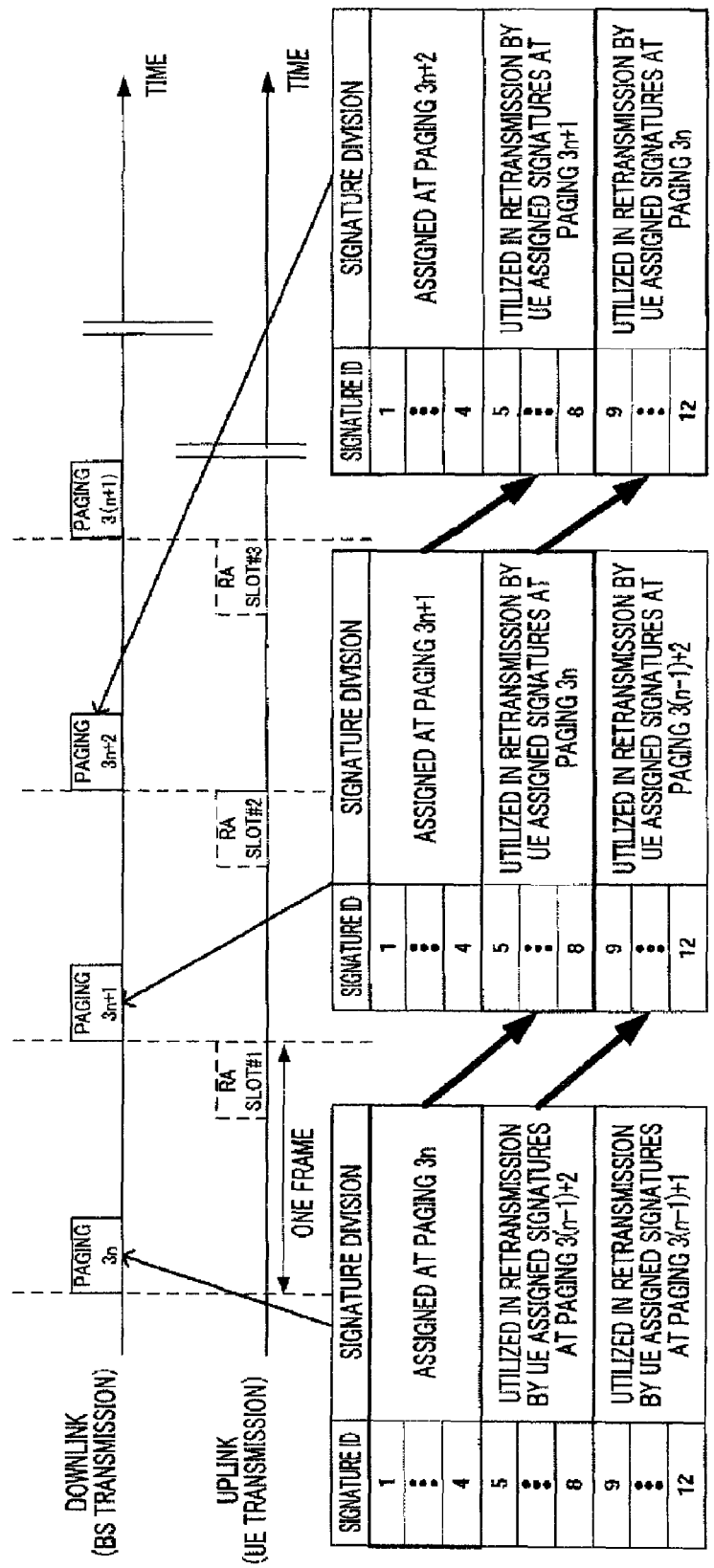
FIG. 9 illustrates the operations of a signature sequence assignment control section according to Embodiment 2 of the present invention.

Next, the operations of signature sequence assignment control section 102 according to Embodiment 2 of the present invention will be explained using FIG. 9. In this figure, three signature groups shown in FIG. 8 are used as an example.

Signature sequence assignment control section 102 switches a signature group used for retransmissions every paging transmission timing and assigns, by retransmissions, signature groups associated with signature groups assigned at the initial time by one-to-one association. This will be explained below in detail.

At paging transmission timing $3n$, the signature sequences of signature group #1 are assigned on a per UE basis, and the UEs assigned the signature sequences of signature group #1 perform RA burst transmissions in RA slot #1.

At paging transmission timing $3n+1$, the signature sequences of signature group #1 are assigned on a per UE basis, and the UEs assigned the signature sequences of signature group #1 perform RA burst transmissions in RA slot #2. Further, in RA slot #2, in the UEs assigned the signature sequences of signature group #1 at paging transmission timing $3n$, retransmissions are performed by the UEs having failed to perform RA burst transmissions in RA slot #1. In this case, the UEs perform retransmissions using the signature sequences of signature group #2 corresponding to the signature sequences assigned at paging transmission timing $3n$.

Similarly, at paging transmission timing $3n+2$, the signature sequences of signature group #1 are assigned on a per UE basis. In RA slot #3, the UEs assigned the signature sequences of signature group #1 perform RA burst transmissions and the UEs assigned signature sequences at paging transmission timing $3n$ and $3n+1$ perform retransmissions. In this case, the UEs assigned signature sequences at paging transmission timing $3n$ performs retransmissions using the signature sequences of signature group #3, and the UEs assigned signature sequences at paging transmission timing $3n+1$ performs retransmissions using the signature sequences of signature group #2.

At paging transmission timing $3(n+1)$, the signature sequences of signature group #1 are assigned on a per UE basis again, the UEs assigned the signature sequences of signature group #1 perform RA burst transmissions in RA slot #1. In this case, although the signature sequences are assigned at paging transmission timing $3n$, if RA bursts from the UEs are not received correctly, the UEs do not perform retransmissions unless paging is performed again.

As described above, by changing the signature group to assign to the UE every paging transmission, it is possible to prevent collision of signature sequences in RA bursts to be retransmitted.

Figure 10:
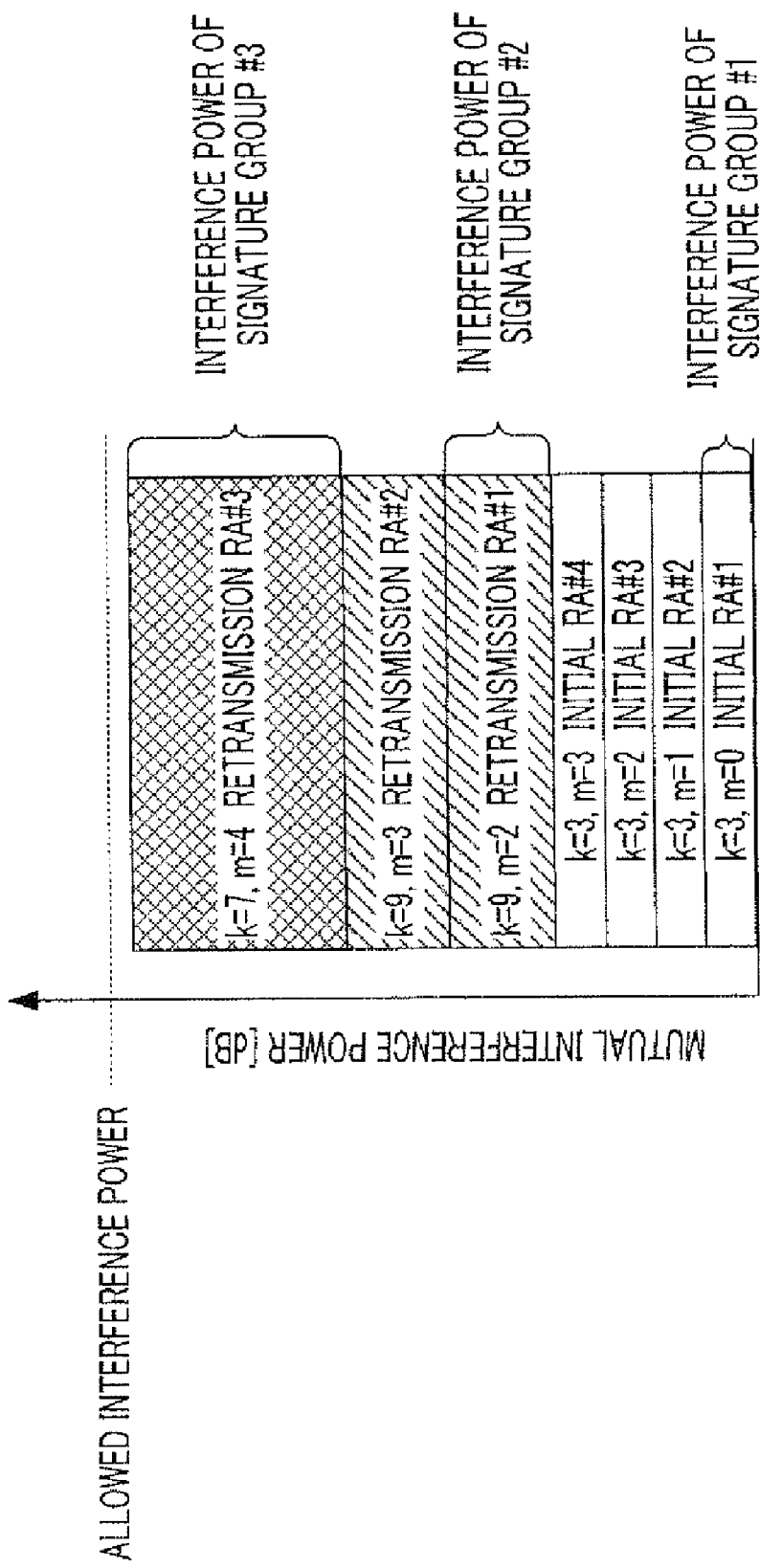
FIG. 10 illustrates the number of RAs that can be transmitted per RA slot according to mutual interference power between signature sequences of the initial RA.

Here, the reason for forming signature groups with signature sequences producing less mutual interference than between the signature groups, will be explained. Although all the UEs reported by paging perform initial transmissions of RA bursts, almost all of the RA burst transmissions succeed, and the expected value of RA bursts to be retransmitted next is relatively small compared to the number of initial RA burst transmissions. Further, the expected value of RA bursts to be retransmitted for the second time is further smaller. Thus, the initial RA burst transmissions are predominant in RA burst transmissions sent in an RA slot at the same time, and, consequently, as shown in FIG. 10, by setting a signature group such that mutual interference power between the signature sequences decreases in order from the initial RA burst transmissions, the initial RA burst retransmissions and the second RA burst retransmissions, it is possible to increase the number of RA bursts that can be transmitted per RA slot. Further, FIG. 10 illustrates an example where the number of RA bursts that can be transmitted per RA slot is seven.

As described above, according to Embodiment 2, by associating signature groups assigned for initial RA burst transmissions with signature groups for retransmissions by one-to-one association every retransmission and changing the signature group for retransmissions every paging transmission, it is possible to prevent collision of initial RA burst transmissions and prevent collision of RA burst retransmissions. Further, when the interference characteristics vary between signature groups, it is possible to further increase the number of RA bursts that can be assigned per RA slot.

Further, a slot assigned by paging may be a dedicated slot for RA bursts initiated from paging transmission, or may be a common slot for RA bursts transmitted from the UE side.

RA burst transmission is always performed after paging transmission, and, consequently, paging transmission is assigned immediately before the RACH transmission area or an RA slot is assigned immediately after paging transmission such that the time interval between the paging transmission timing and the RA burst transmission timing is shortened. By this means, it is possible to minimize the processing delay required for resynchronization processing.

Further, although example cases have been described with the above-described embodiments where the assignment cycle is three, the present invention is not limited to this, and an assignment cycle different from three is possible.

Further, although example cases have been described with the above-described embodiments where assigned signature sequences are informed by paging, the preset invention is not limited to this, and it is equally possible to use other channels such as a down link control channel including scheduling information, and L2/L3 control message information transmitted in a downlink common channel.

Although example cases have been described with the above embodiments where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosure of Japanese Patent Application No. 2006-222198, filed on Aug. 17, 2006, including the specification, drawings and abstract, is incorporated herein by reference in its entirety.

INDUSTRIAL APPLICABILITY

The radio transmitting apparatus and radio transmitting method according to the present invention can improve throughput and perform faster initial access processing including RA bursts, and, for example, are applicable to the mobile communication system.

The invention claimed is:

1. A radio transmission apparatus comprising:
a selecting section that selects a first signature sequence for use in an initial transmission by a first radio communication terminal apparatus from a first signature group comprising a plurality of signature sequences generated by cyclically shifting the same first Zadoff-Chu sequence, and selects a second signature sequence for use in a retransmission by a second radio communication terminal apparatus from a second signature group comprising a plurality of signature sequences generated by cyclically shifting the same second Zadoff-Chu sequence different from the first Zadoff-Chu sequence, the first and second radio communication terminal apparatuses being configured to transmit in a same time slot; and
a transmission section that transmits identification information of the selected first and second signature sequences, wherein:
the selecting section selects a first signature sequence for use in an initial transmission in a first time slot which is different from a first signature sequence for use in an initial transmission in a second time slot adjacent to the first time slot and a second signature sequence for use in a retransmission in the second time slot which is the same as the first signature sequence for use in the initial transmission in the first time slot.

2. The radio transmission apparatus according to claim 1, wherein the selecting section selects the first and second signature sequences for use in a random access transmission domain.

3. The radio transmission apparatus according to claim 1, wherein the selecting section selects the first and second signature sequences from the first and second signature groups which change every generation timing of a control channel.

4. The radio transmission apparatus according to claim 1, wherein the selecting section selects the first and second signature sequences from the first and second signature groups which change between the initial transmission of the first signature sequences and the retransmission of the second signature sequences.

5. The radio transmission apparatus according to claim 4, wherein the first signature group for use in the initial transmission and the second signature group for use in the retransmission are associated by a one-to-one association.

6. The radio transmission apparatus according to claim 1, wherein the transmission section transmits the identification information using a control channel.

7. The radio transmission apparatus according to claim 6, wherein the control channel comprises a paging channel.

8. A radio communication base station apparatus comprising the radio transmission apparatus according to claim 1.

9. A radio transmission method performed by a radio transmission apparatus, the radio transmission method comprising:
selecting a first signature sequence for use in an initial transmission by a first radio communication terminal apparatus from a first signature group comprising a plurality of signature sequences generated by cyclically shifting the same first Zadoff-Chu sequence, and selecting a second signature sequence for use in a retransmission by a second radio communication terminal apparatus from a second signature group comprising a plurality nature sequences generated by cyclically shifting the same second Zadoff-Chu sequence different from the first Zadoff-Chu sequence, the first and second radio communication terminal apparatuses being configured to transmit in a same time slot; and
transmitting identification information of the selected first and second signature sequences, wherein:
the selecting operation includes selecting a first signature sequence for use in an initial transmission in a first time slot which is different from a first signature sequence for use in an initial transmission in a second time slot next to the first time slot, and a second signature sequence for use in a retransmission in the second time slot which is the same as the first signature sequence for use in the initial transmission in the first time slot.

10. A radio transmission apparatus comprising:
a selecting section that selects a first signature sequence for use in an initial transmission in a given time slot performed exclusively by a first radio communication terminal apparatus from a first signature group and selects a second signature sequence for use in a retransmission in the given time slot performed exclusively by a second radio communication terminal apparatus from a second signature group different from the first signature group; and
a transmission section that transmits identification information of the selected first and second signature sequences, wherein:
the first signature group comprises a plurality of signature sequences generated by cyclically shifting the same first Zadoff-Chu sequence and the second signature group comprises a plurality of signature sequences generated by cyclically shifting the same second Zadoff-Chu sequence different from the first Zadoff-Chu sequence, such that the plurality of signature sequences are orthogonal to each other in the same signature group or have lower cross correlations than a cross correlation between signature sequences in different signature groups.

11. The radio transmission apparatus according to claim 10, wherein the selecting section selects the first and second signature sequences for use in a random access transmission domain.

12. The radio transmission apparatus according to claim 10, wherein the selecting section selects the first and second signature sequences from the first and second signature groups which change every generation timing of a control channel.

13. The radio transmission apparatus according to claim 10, wherein the selecting section selects the first and second signature sequences from the first and second signature groups which change between the initial transmission of the first signature sequences and the retransmission of the second signature sequences.

14. The radio transmission apparatus according to claim 13, wherein the first signature group for use in the initial transmission and the second signature group for use in the retransmission are associated by a one-to-one association.

15. The radio transmission apparatus according to claim 10, wherein the transmission section transmits the identification information using a control channel.

16. The radio transmission apparatus according to claim 15, wherein the control channel comprises a paging channel.

17. A radio communication base station apparatus comprising the radio transmission apparatus according to claim 10.

18. A radio transmission method performed by a radio transmission apparatus, the radio transmission method comprising:

selecting for use in an initial transmission in a given time slot performed exclusively by a first radio communication terminal apparatus a first signature sequence from a first signature group and selects a second signature sequence for use in a retransmission in the given time slot performed exclusively by a second radio communication terminal apparatus from a second signature group different from the first signature group; and transmitting identification information of the selected first and second signature sequences, wherein:

the first signature group comprises a plurality of signature sequences generated by cyclically shifting the same first Zadoff-Chu sequence and the second signature group comprises a plurality of signature sequences generated by cyclically shifting the same second Zadoff-Chu sequence different from the first Zadoff-Chu sequence, such that the plurality of signature sequences are orthogonal to each other in the same signature group or have lower cross correlations than a cross correlation between signature sequences in different signature groups.

* * * * *

UNITED STATES PATENT AND TRADEMARK OFFICE
CERTIFICATE OF CORRECTION

| | | |
|---|---|---|
| PATENT NO. | : 8,379,662 B2 | Page 1 of 1 |
| APPLICATION NO. | : 12/377576 | |
| DATED | : February 19, 2013 | |
| INVENTOR(S) | : Daichi Imamura et al. | |

It is certified that error appears in the above-identified patent and that said Letters Patent is hereby corrected as shown below:

In the Claims

Claim 1, Column 13, line 40 incorrectly reads:

"first time slot and a second signature sequence for use in"

and should read

"first time slot, and a second signature sequence for use in".

Claim 9, Column 14, line 14 incorrectly reads:

"nature sequences generated by cyclically shifting the"

and should read

"signature sequences generated by cyclically shifting the".

Signed and Sealed this
Eighth Day of April, 2014

Michelle K. Lee
*Deputy Director of the United States Patent and Trademark Office*